US011935292B2

(12) United States Patent
Robinson et al.

(10) Patent No.: US 11,935,292 B2
(45) Date of Patent: Mar. 19, 2024

(54) METHOD AND A SYSTEM FOR ANALYZING A SCENE, ROOM OR VENUE

(71) Applicant: Carnegie Robotics, LLC, Pittsburgh, PA (US)

(72) Inventors: David Ian Robinson, Pittsburgh, PA (US); Troy Edward Tancraitor, Pittsburgh, PA (US); David Larose, Pittsburgh, PA (US)

(73) Assignee: Carnegie Robotics, LLC, Pittsburgh, PA (US)

( * ) Notice: Subject to any disclaimer, the term of this patent is extended or adjusted under 35 U.S.C. 154(b) by 455 days.

(21) Appl. No.: 17/354,577

(22) Filed: Jun. 22, 2021

(65) Prior Publication Data

US 2021/0397841 A1 Dec. 23, 2021

Related U.S. Application Data

(60) Provisional application No. 63/042,180, filed on Jun. 22, 2020.

(51) Int. Cl.
*G06K 9/00* (2022.01)
*G01C 21/20* (2006.01)
*G06T 7/70* (2017.01)
*G06V 20/20* (2022.01)

(52) U.S. Cl.
CPC ............. *G06V 20/20* (2022.01); *G01C 21/20* (2013.01); *G06T 7/70* (2017.01); *G06T 2207/30244* (2013.01)

(58) Field of Classification Search
CPC ........ G06V 20/20; G06V 20/10; G01C 21/20; G06T 7/70; G06T 2207/30244; G05D 1/0274; G05D 2201/02; G05D 1/0234; G05D 1/0246
See application file for complete search history.

(56) References Cited

U.S. PATENT DOCUMENTS

| 7,177,737 | B2 | 2/2007 | Karlsson et al. |
| 8,508,527 | B2 | 8/2013 | Jeong et al. |
| 8,588,512 | B2 | 11/2013 | Yoon et al. |
| 9,424,470 | B1 * | 8/2016 | Hinterstoisser ........ G06V 20/10 |
| 9,565,363 | B1 * | 2/2017 | Hatao .................... G01B 11/14 |

(Continued)

FOREIGN PATENT DOCUMENTS

| CN | 103680291 B | 12/2016 |
| CN | 103994762 B | 1/2017 |

(Continued)

OTHER PUBLICATIONS

Extended European Search Report and Written Opinion from corresponding Application No. EP21180741.7, dated Nov. 15, 2021.

(Continued)

*Primary Examiner* — Shervin K Nakhjavan
(74) *Attorney, Agent, or Firm* — Workman Nydegger

(57) ABSTRACT

In a method or system in which an imaging element views navigation elements for e.g. navigation, the navigating elements may not be positioned optimally. Positions may exist in which the same angles exist from the imaging element to the same or similar navigating elements, whereby the positions are not unique. Navigation elements may then be repositioned, added or removed to make the positions unique.

26 Claims, 2 Drawing Sheets

(56) References Cited

U.S. PATENT DOCUMENTS

| | | | |
|---|---|---|---|
| 11,231,711 B2* | 1/2022 | Li | A61G 5/041 |
| 11,287,828 B2* | 3/2022 | Bai | G06T 7/20 |
| 11,435,480 B2* | 9/2022 | Lin | G05D 1/024 |
| 11,449,063 B1* | 9/2022 | Ebrahimi Afrouzi | A47L 9/2857 |
| 2004/0239756 A1* | 12/2004 | Aliaga | G06T 7/73 348/36 |
| 2007/0267570 A1* | 11/2007 | Park | B25J 5/007 250/221 |
| 2010/0188510 A1 | 7/2010 | Yoo et al. | |
| 2014/0267703 A1 | 9/2014 | Taylor et al. | |
| 2016/0144505 A1* | 5/2016 | Fong | G05D 1/0274 700/250 |
| 2016/0280036 A1 | 9/2016 | Ishikawa | |
| 2016/0282875 A1 | 9/2016 | Nagamine et al. | |
| 2016/0302639 A1 | 10/2016 | Lindhé et al. | |
| 2016/0357189 A1* | 12/2016 | Barrows | H04B 10/116 |
| 2017/0031369 A1 | 2/2017 | Liu et al. | |
| 2017/0177958 A1 | 6/2017 | Yamanoi et al. | |
| 2020/0159246 A1* | 5/2020 | Cui | G05D 1/0221 |
| 2021/0138657 A1* | 5/2021 | Cui | B25J 9/1666 |
| 2021/0208608 A1* | 7/2021 | Lin | G05D 1/0038 |
| 2022/0221274 A1* | 7/2022 | Fang | G06T 7/97 |
| 2022/0338526 A1* | 10/2022 | Yao | B32B 25/08 |

FOREIGN PATENT DOCUMENTS

| | | |
|---|---|---|
| EP | 0363339 A2 | 4/1990 |
| EP | 3508937 A1 | 7/2019 |

OTHER PUBLICATIONS

Belo et al., "3 Known Landmarks are Enough for Solving Planar Bearing SLAM and Fully Reconstruct Unknown Inputs," 2010 IEEE/RSJ International Conference on Intelligent Robots and Systems, Oct. 18-22, 2010, pp. 2539-2545.

Burschka et al., "Optimal Landmark Configuration for Vision-Based Control of Mobile Robots," Proceedings of the 2003 IEEE International Conference on Robotics & Automation, Sep. 14-19, 2003, pp. 3917-3922.

Sutherland et al., "Localizing in Unstructured Environments: Dealing with the Errors," IEEE Transactions on Robotics and Automation, vol. 10, No. 6, Dec. 31, 1994, pp. 740-754.

* cited by examiner

METHOD AND A SYSTEM FOR ANALYZING A SCENE, ROOM OR VENUE

FIELD OF THE INVENTION

The present invention relates to a system or method for analyzing a scene, room or venue and in particular for analyzing the positions and/or visibility of navigation elements in the scene/room/venue.

BACKGROUND OF THE INVENTION

Navigation elements may be provided in the room/scene/venue in order to assist a robot in navigating in the room or the like. In that situation, it may be desired to check the quality or uniqueness of the positions of the navigation elements in order to assess how well the robot position is constrained or determined.

Self-moving devices, such as robotic vehicles, need to be able to navigate in order to safely perform required tasks in a safe and reliable manner. To this end, such movable devices may be provided with various sensors allowing the movable device to recognise the surrounding environment, determine its position, e.g. relative to a map, identify obstacles, etc.

Thus, movable devices may be provided with vision-based detectors, such as cameras, allowing the movable device to 'see' the surroundings, and possibly estimate the distance to objects, walls, etc. Such devices may be seen in U.S. Pat. No. 7,177,737, EP0363339 and U.S. Pat. No. 8,588,512.

SUMMARY

In a first aspect, the invention relates to a method of analysing a scene, room or venue comprising a plurality of navigation elements, the method comprising:
at each of a plurality of positions in the scene/room/venue:
providing image data using an imaging element,
determining which navigation elements are visible from the pertaining position and
determining an angle from the imaging element to each of the visible navigation elements,
identifying one or more groups of positions wherein the angles relating to respective visible navigation element vary by no more than 10 degrees from position to position, and
outputting information relating to the identified groups.

In the present context, a scene, room or venue may be any type of environment, such a room, facility, storage room, production space, terminal, warehouse, store, waiting room, sports arena, indoor or outdoor or the like. Preferably, the scene or the like is indoor as it is preferred that at least some of the navigation elements are provided on a ceiling or walls. In that manner, a camera or vision element may be provided on top of a system, such as a robot, and may be viewing in e.g. an upward, forward, backward, and/or sideward direction to view and determine or identify the navigation elements.

In the present context, a navigation element may be any visible element which may be determined or detected by the method. In a preferred embodiment, at least some of the navigation elements are elements provided in the space or the like mainly or only for the method to determine and identify. Such elements may be plane or flat elements which may have a particular appearance, such as a particular colour, shape, dimension or visible pattern, such as one or more geometrical shapes and/or a barcode, 1-dimensional or two-dimensional, or other kinds of machine readable codes. A navigation element may alternatively have a hologram or even have invisible contents, such as fluorescent contents or contents emitting, scattering or reflecting radiation outside of the visible wavelength range.

Preferably, a plurality of navigation elements is provided, such as at different positions in the room or the like, so that at all positions in the room or the like, one or more navigation elements are visible. The positions of the navigation elements may be compared to a map or other information relating navigation element positions with positions in the room or the like, so that merely by viewing the navigation elements, the position of the robot, imaging device or the like may be determined in the room or at least relative to the navigation elements.

A problem which may be encountered, however, is if a position is not unique, in that it is then not necessarily certain that the robot or vision element knows where it is. If the robot moves from a unique position to a non-unique position, the robot may know which non-unique position it is in, if the non-unique positions are remote from each other, but if the robot loses its position, such as if it is restarted, it may not know in which position it is, if the position is non-unique.

The method comprises, at each of a plurality of positions in the scene/room/venue, providing image data using an imaging element.

In this context, a position in the scene or the like may be a position at a predetermined distance above a floor or the ground for example. The position may alternatively be a 3-dimensional position in the room or the like, or a position may be that seen when projected on to a horizontal plane. In addition to the actual position, a direction of the robot may be added, e.g. in the form of a pose of the robot.

A position may be determined with an accuracy that depends on the accuracy of the determination or identification of the navigation elements. A position may be determined from the relative angles and/or distances to the navigation element(s) with knowledge of the positions of this/these element(s) in the room or the like, such as using a map of the room or the like with the positions of the navigation element(s). Alternatively, other positioning determinations may be made, such as using other sensors. A LIDAR or odometer, for example, as well as 5G triangulation, GPS positioning or the like may be used for determining the position. A position may be absolute, such as a GPS position, or relative, such as relative to a historic position.

The image data may be usual image data as provided by a camera, such as a still camera, video camera, analogue camera and/or digital camera. The image data may be a 2-D representation of an image projected on to a sensitive portion of a camera via optics, as is usual.

The determination of which navigation elements are visible from the pertaining position preferably is made from the image data. Many manners exist of identifying predetermined elements in images. The elements may output or emit a particular colour identifiable from the image (such as if the image was generated using a filter removing other colours), or if the element had a particular appearance which may be determined in the image by translating a corresponding filter over the image to identify such appearances. Alternatively, feature descriptor based methods and data-driven methods may be used based on Convolutional Neural Networks.

From this determination, it is known which navigation elements are visible, such as determinable from the image data.

In this context, it is noted that a navigation element may be seen as visible if a direction toward it may be determined with a sufficient accuracy from the image data. Clearly, if a navigation element is too far away or is seen from an unfavourable angle, it may be represented in the image data in a manner so that the determination of the angle toward it is not sufficiently accurate to both ascertain that it is a navigation element and determine the angle toward it. Often, if the navigation element is represented by few pixels or within a too small area, this makes angle or position determination, and also recognition of the appearance, inaccurate as the resolution of the image data may play a too big role.

Alternatively, the navigation element may be confused with other elements in the image data if it is too far away or seen from an unfavourable angle. In that situation, the resulting determination of the position may be too inaccurate. In that situation, the navigation element in this context may be seen as not visible, so that positioning or navigation will not take that navigation element into account.

An angle is determined from the imaging element to the visible navigation elements, preferably from the imaging element to each visible navigation element. This angle may be determined from a position of the pertaining navigation element in the image data. Usually, the image data comprises a number of values of individual pixels, where a pixel relates to the radiation impinging on a portion of a sensing element of the imaging element. The individual pixel thus relates to an angle from the imaging element, usually defined by optics provided between the sensitive element and the surroundings. Thus, from knowledge of which pixels represent a navigation element, the angle from the imaging element to the navigation element may be determined.

The angle may be determined in a number of manners. Often, the angle is relative to the sensitive portion of the imaging element but may be determined in relation to an object to which the imaging element is attached, such as a robot. A simple transformation may be made from the ID of one or more pixels viewing the navigation element to an angle relative to any direction defined in relation to the imaging element, such as an angle relative to the coordinate system of the robot, or such as an angle relative to another imaging element.

Then, knowing the angles from the imaging element toward the visible navigation element(s), it may be possible to determine the position of the imaging element, such as if no other positions exist where the same number of navigation elements is visible and where the angles from the imaging element to the navigation elements are the same. If such other positions exist, the position may not be unique, and it may be problematic to e.g. navigate the room or the like.

Therefore, groups of positions are identified wherein the angles relating to each visible navigation elements vary by no more than 10 degrees from position to position. In one embodiment, a group of positions has angles to each visible navigation element varying no more than 10 degrees to an angle of a predetermined navigation element. Thus, positions are identified from which, for each navigation element visible in one position, a relative angle from the imaging element to the visible navigation element is within 10 degrees, such as within 5 degrees, such as within 1 degree, such as within 0.5 degree of the relative angle to a navigation element from the imaging element in another position of the group. This accuracy may be determined based on e.g. a resolution of the image data. If the image data has a high resolution so that the relative angle may be determined within 1 degree or better, the accuracy may be set to one degree or even less.

When, from all positions of a group, the same relative angles exist, within the above accuracy, toward the navigation elements visible at each group position, these positions are not unique. The imaging element may not be able to determine in which position of a group of positions it is in.

Thus, information relating to the identified groups may be output. This information may be a list of positions of a group of positions. Below, other types of information are described, such as information relating to how to reposition, remove or add navigation elements in order to make a non-unique position unique.

In this context, it is noted that it may be desired that positions are no less than 10 cm, such as no less than 50 cm, such as no less than 100 cm from each other. In that manner, two positions within 10 cm or the like are not seen as different positions and cannot be positions within e.g. the same group of positions.

Then, the analysis may comprise determining, for each position, the relative angle(s) and comparing this/these to those of the other positions visited. If the same relative angle(s) is/are identified, the position is not unique, and information to that effect may be output.

As mentioned, a robot or the like may carry the imaging element and may move around in the room or the like. The robot may navigate using the imaging element and the positions determined while the analysis is performed. A robot may comprise additional sensors for e.g. determining the robot's position or relative position. A robot may comprise LIDARs, odometers and the like which are capable of determining a new position when a historic position was known.

Alternatively, the imaging element may be transported around in the room or the like in order to perform the analysis separately from any robot or other activity in the room or the like. In one situation, a mobile phone may be transported around in the room or the like while allowing its camera to e.g. look upwardly in order to identify the navigation elements. The mobile phone may additionally determine its position, which may be obtained using GPS, triangulation or the like.

Situations exist where two positions with the same relative angle(s) are nevertheless unique.

In one situation, the distance to the navigation element(s) may be taken into account. This distance may be derived from the image data from an extent therein of the navigation element, knowing the actual size of the navigation element. Thus, from this distances or extent, positions may be distinguished. Other manners are observing the angle toward the navigation element as the robot moves, where the distance between the robot and the navigation element relates to the distance moved and the angle difference. Alternatively, the distance may be determined using a distance sensor.

In another situation, some of or all of the navigation elements have an appearance, where the appearance of each visible navigation element is determined, and wherein the identifying step comprises identifying the one or more groups of positions wherein, in each position of a group of positions, the visible navigation element(s) have the same appearances. Thus, even positions where the visible navigation elements are in the same relative angles may be distinguished from each other when the visible navigation elements have different appearances. Clearly, it suffices that one of the navigation elements has an appearance different from that of another position but at the same relative angle.

As described above, a different appearance may be due to a difference in colour, navigation element shape, in a shape depicted on the navigation element, such as different geometric shapes thereon—or combinations thereof. Different appearances may also be obtained by depicting on different navigation elements different bar codes, 1D or 2D, or combinations of colours, shapes and the like. Naturally, all navigation elements may have different appearances, such as in the situation where all navigation elements have thereon different 2D bar codes. A sufficient number of 2D bar codes exist to make this possible, but this is not absolutely required. What is desired is that no two positions have the same relative angles to navigation elements with the same appearances. Thus, it may be required only to have 2, 3, 4, 5, 6, 7, 8, 9, 10, 15 or 20 different appearances.

In this situation, the navigation element may only be seen as visible, if the appearance thereof may be determined from the image data. In this situation, it may be desired that the navigation element to be visible is represented by a minimum number of pixels or a minimum area in the image.

Even when two positions have the same relative angles to navigation elements having the same appearances, it may be possible to distinguish the positions from each other, such as when at least one of the visible navigation elements has a non-rotationally symmetric appearance. Then the identifying step may comprise identifying the one or more groups of positions wherein, in each position of a group of positions, the visible navigation element(s) have the same appearances and relative rotation. Even when navigation elements are present at the same relative angles and the same appearances, the positions may be distinguished if a navigation element is rotated in one position compared to the other position.

In this situation, it may be assumed that a navigation element is only visible, if the rotation thereof may be determined with a sufficient accuracy. Thus, it may be desired that the navigation element to be visible is represented by a minimum number of pixels or a minimum area in the image.

Naturally, a navigation element with an appearance, such as a shape and/or a depiction, of an isosceles triangle will look the same from a number of angles but not from other angles. A 2D bar code may not have any symmetry so that it looks differently from all angles.

It may be desired that one or more of the navigation elements are elements fastened to walls and/or ceilings or other fixed structures, such as storage racks and ceiling structures, of the scene/room/venue. In this context, "fastening" may comprise hanging from. Then, the room or the like may be prepared for e.g. robot navigation by simply fastening such navigation elements at suitable positions. Alternatively, the navigation elements may be provided by painting or printing the desired information directly on the wall/ceiling.

Naturally, also other elements in the room or the like, such as doors, windows, ducts, lamps, speakers, fire hoses, power outlets, contacts/switches, decorations, pictures/paintings, corners or the like, can act as navigation elements to enhance the density of navigation elements.

In one embodiment, one or more navigation elements may vary over time, where this variation may identify the navigation element. A very simple variation may be a variation of light intensity. An LED or a lamp blinking with a unique frequency will function as a navigation element. Multiple such lamps may blink with different frequencies and may then be distinguished. Clearly, more complex navigation elements may be contemplated, such as displays or monitors varying between displaying content for humans (advertisements for customers for example), and which occasionally, such as every second, display a single or a few images of e.g. a bar code. Actually, a sensor may detect a single image of the 24, 50, 60, 100, 120 or more images per second generated by a display, so that the information for the robot may be embedded in a display for humans, where the robot or the imaging system may discern this information, such as a bar code or the like, and use this for the determination of the ID or information of the navigation element.

Having attached the navigation elements to the surface of the room or the like, the present analysis may be performed, resulting in the determination of any groups of non-unique positions. Below, actions are described which may be taken to render non-unique positions unique.

In one situation, the method further comprises adding a navigation element visible from an identified position, such as a position of a group. Clearly, adding a navigation element visible from a position of the group will distinguish this position from the other position(s) of the group. It may be desired, however, to ascertain that the position, with this added navigation element, is unique from also all other positions. If not, a new group may be formed with this position with the newly added navigation element and another position.

Clearly, knowing of the relative positions, and appearances/rotations if applicable, of the other positions, the information output may not only be information relating to positions of a group; this information output may also be information or suggestions as to where to position the new navigation element and optionally also an appearance and/or rotation thereof to ensure that the position then becomes unique.

In another embodiment, the method comprises removing a navigation element visible from an identified position. As described above, this will allow distinguishing the position from the other position(s) of the group. Preferably, it is ascertained, however, that the position with the navigation element removed now is unique and does not form a group with another position.

In a further embodiment, the method further comprises displacing a navigation element visible from an identified position. Again, this will distinguish this position from the other position(s) in the group, but it is preferably ascertained that the position with the displaced navigation element does not form a group with another position.

Naturally, a navigation element may be visible from a plurality of positions. Then, removing, adding or displacing a navigation element may affect also these other positions. Thus, when determining where to add a navigation element, remove a navigation element or displace a navigation element, the impact of these other positions may be taken into account to ensure that unique positions remain unique.

A large number of manners exist of outputting this information. Clearly, an operator may be requested to take down a red navigation element in approximately this and that position or to add a blue navigation element visible in this or that position. Or to move a green navigation element 1 m toward west.

However, when the imaging element is carried on a robot, the robot may move to a position directly under or to the side of the navigation element to be removed or displaced and/or to a position where a new navigation element is to be mounted or a displaced navigation element to be attached.

If the method is performed on a mobile phone, portable, pad or the like, the image may be provided on a display on the mobile phone or the like and the navigation element to be removed or displaced may be highlighted in the displayed image as may a position where to attach a new or displaced navigation element.

This makes the adaptation of the navigation elements very simple and intuitive.

A second aspect of the invention relates to a system for analysing a scene, room or venue comprising a plurality of navigation elements, the system comprising:
   an imaging element configured to provide image data at each of a plurality of positions in the scene/room/venue,
   a processor configured to, for each position:
   determine which navigation elements are visible from the pertaining position,
   determine an angle from the imaging element to each of the visible navigation elements,
   identify one or more groups of positions wherein, in each position of a group, the angles relating to respective visible navigation elements vary by no more than 10 degrees from position to position, and
   output information relating to the identified groups.

Clearly, all aspects, embodiments, situations or the like may be combined in any manner desirable.

In this context, the imaging element may be as described above.

The processor may be any type of processor, such as a RISC processor, ASIC, controller, microcontroller, FPGA, DSP, ASIC, software controllable or hardwired or any combination thereof. The processor may be divided into elements some or all of which may be handled by remote servers, such as by a cloud solution. The processor or a part thereof may form part of the imaging element, be separate therefrom or remote therefrom. The image data may be fed to the processor using any type of signal, wired or wirelessly as well as on any protocol and using any type of encryption, compression, format and the like.

The processor is configured to perform the method described above where the image data is analysed in order to determine which navigation elements are visible in a position.

The system may further comprise a positioning element for determining a position of the imaging element or the system. This may be an absolute position such as determined using GPS, 5G GSM or network/beacon triangulation. Alternatively, the system may comprise other sensors such as a LIDAR which may determine a position relative to elements in the room or the like. The position may then be determined from e.g. a map of the room or the like from which the elements viewed by the LIDAR are represented. Alternatively, a LIDAR or other sensor, such as an odometer, may be used for determining a relative movement from a historic position, so that the new position may be determined at least with some accuracy.

The processor is also able to identify the visible navigation elements in the image data and determine the relative angles to such navigation elements. The individual position may be stored with the relative angles, so that if a new position is arrived at which has the same relative angles, within the desired accuracy, a group of positions may be formed.

The system may comprise means for outputting the information, such as a loudspeaker, a display, a monitor or the like. As described above, the information may be output as images, directions or even in the form of instructions to a robot as to where to move to or to direct a radiation beam, for example, in order to illustrate to an operator which navigation element to remove/displace and where to mount a new or displaced navigation element.

In one embodiment, all navigation elements have an appearance, where the controller is configured to determine an appearance of each visible navigation element, and to identify the one or more groups of positions wherein, in each position of a group of positions, the visible navigation element(s) have the same appearances.

In that or another embodiment, at least one navigation element has a non-rotationally symmetric appearance and wherein the processor is configured to identify the one or more groups of positions wherein, in each position of a group of positions, the visible navigation element(s) have the same appearances and relative rotation.

It may be desired that one or more of the navigation elements are elements fastened to walls and/or ceilings of the scene/room/venue. Alternatively, a navigation element may be painted or printed on to a wall or the like.

In one situation, the processor is configured to output information as to the adding of a navigation element visible from an identified position.

In one situation, the processor is configured to output information as to the removal of a navigation element visible from an identified position.

In one situation, the processor is configured to output information as to the displacing of a navigation element visible from an identified position.

A third aspect of the invention relates to a method of analysing a scene, room or venue comprising a plurality of navigation elements, the method comprising, at each of a plurality of positions in the scene/room/venue:
   providing image data using an imaging element,
   determining from the image data which navigation elements are visible from the pertaining position,
   determining an angle from the imaging element to each of the visible navigation elements,
   comparing the angle(s) to predetermined information and determining whether all visible navigation elements are positioned with angles according to the predetermined information and
   if the comparison identifies that a navigation element has been displaced relative to the predetermined information, either:
   repositioning the navigation element to the original position or
   updating the predetermined information accordingly or
   positioning the navigation element at a new position where, for each first position of the positions from which the navigation element at the new position is visible, angles exist to all navigation elements visible from the pertaining first position, and where no other position exists having angles toward all navigation elements visible from the other position, which angles are within 10 degrees of the angles toward the navigation elements visible from the pertaining first position, and/or
   if the comparison identifies that a navigation element is missing relative to the predetermined information, either:
   positioning a navigation element in the position of the missing navigation element or
   updating the predetermined information accordingly or
   positioning the navigation element at a new position where, for each first position of the positions from which the navigation element at the new position is visible, angles exist to all navigation elements visible from the pertaining first position, and where no other position exists having angles toward all navigation elements visible from the other position, which angles are within 10 degrees of the angles toward the navigation elements visible from the pertaining first position.

In this context, the scene or the like may be as described above, as may the imaging element, the processor and the navigation elements.

In this aspect of the invention, the relative angles are compared to predetermined information, which may be a map or the like from which the intended, assumed or historic positions of the navigation elements, as well as any appearance and/or rotation thereof, may be derived. Thus, from the angles and potentially other information, determined from the image data, the position of the imaging element may be determined.

Naturally, the angles may be replaced by relative positions between the navigation elements and the imaging element or even merely between the navigation elements. The present method focuses on determining whether discrepancies exist between the actual and the assumed positions (and potentially appearances/rotations) of the navigation elements.

However, situations exist where the positions of the navigation elements have been changed, where new navigation elements have been added or navigation elements have been removed or lost. A navigation element may become damaged or dirty to a degree where it is no longer identified as a navigation element. This may be seen as a damaged navigation element which then can no longer be used for the position determination.

In such situations, the navigation elements no longer match the map or predetermined information. This may be detected and acted upon.

Even though a discrepancy is seen between the navigation elements visible (the angles and potentially their appearances and rotations) to the imaging element map and the predetermined information, the imaging element may still be in a position to determine its position. The position may be determined by other sensors, such as GPS sensors, GSM sensors, such as 5G sensors, or the like, or from e.g. a historic position, such as LIDARs, odometers and the like which are able to track the movement of the imaging element. Clearly, also the relative movement of the navigation elements when the imaging element moves in the room or the like may be tracked.

During this movement, the imaging element may provide the image data and the processor may compare this to the predetermined information and, for example, determine the position of the imaging element. Then, if a discrepancy is determined between the predetermined information and the navigation elements seen in the image data, the processor may identify the cause of the discrepancy.

The comparison may identify that a navigation element has been displaced relative to the predetermined information. In that position, the method may comprise either repositioning the navigation element to the original position, updating the predetermined information accordingly or the navigation element may be positioned in a new position. This new position preferably makes the positions of the imaging element unique, as described above in the first aspect of the invention. At least this new position preferably does not make any position, from which the navigation element in the new position may be seen, non-unique. Thus, the method may comprise the alternative of positioning the navigation element at a new position where, for each first position of the positions from which the navigation element at the new position is visible, angles exist to all navigation elements visible from the pertaining first position, and where no other position exists having angles toward all navigation elements visible from the other position, which angles are within 10 degrees of the angles toward the navigation elements visible from the pertaining first position.

A repositioning may be effected by the controller outputting information relating to, as is described above, which navigation element is to be repositioned and to which position.

The updating of the predetermined information may then comprise removing information relating to the navigation element at the former position and adding information relating to the new position thereof (and any rotation thereof), so that the predetermined information now matches what the imaging element sees.

Alternatively or in addition, the comparison may reveal that a navigation element is missing relative to the predetermined information. Then, the method may comprise either positioning a navigation element in the position of the missing navigation element, updating the predetermined information accordingly or positioning the navigation element at a new position as described above. The new position may be selected so that all positions from which the newly positioned navigation element is visible, are unique. Thus, this alternative may be the positioning the navigation element at a new position where, for each first position of the positions from which the navigation element at the new position is visible, angles exist to all navigation elements visible from the pertaining first position, and where no other position exists having angles toward all navigation elements visible from the other position, which angles are within 10 degrees of the angles toward the navigation elements visible from the pertaining first position.

The updating of the predetermined information then may be the deletion of the portion of that information relating to the navigation element.

Clearly, this aspect may be combined with the first aspect of the invention so that updating of the predetermined information may be proposed or possible only if the position is unique with the displaced/missing navigation element.

In one embodiment, one or more of the navigation elements further has an appearance, the method further comprising determining an appearance of each visible navigation element, wherein the comparison further comprises:
  determining that a visible navigation element has been rotated, relative to the predetermined information and either:
  rotating the navigation element to the original orientation or updating the predetermined information accordingly.

A fourth aspect of the invention relates to a system for analysing a scene, room or venue comprising a plurality of navigation elements, the system comprising:
  an imaging element configured to provide image data at each of a plurality of positions in the scene/room/venue,
  a processor configured to, for each position:
  determine from the image data which navigation elements are visible from the pertaining position,
  determine an angle from the imaging element to each of the visible navigation elements,
  compare the angle(s) to predetermined information and determining whether all visible navigation elements are positioned with angles according to the predetermined information and if the comparison identifies that a navigation element has been displaced relative to the predetermined information, either:
output instructions to reposition the navigation element to the original position or
update the predetermined information accordingly or
output instructions to position the navigation element at a new position where, for each first position of the positions from which the navigation element at the new position is visible, angles exist to all navigation elements visible from the pertaining first position, and where no other position exists having angles toward all navigation elements visible from the other position, which angles are within 10 degrees of the angles toward the navigation elements visible from the pertaining first position, and/or
if the comparison identifies that a navigation element is missing relative to the predetermined information, either:
output instructions to position a navigation element in the position of the missing navigation element or
update the predetermined information accordingly or
output instructions to position the navigation element at a new position where, for each first position of the positions from which the navigation element at the new position is visible, angles exist to all navigation elements visible from the pertaining first position, and where no other position exists having angles toward all navigation elements visible from the other position, which angles are within 10 degrees of the angles toward the navigation elements visible from the pertaining first position.

In this aspect, the imaging element, processor, angles and navigation elements may be as described before. This aspect may be combined with any aspect of the invention.

Thus, the imaging element provides image data and feeds this to the processor which performs the method as described above.

The system may have instruction elements for outputting the instructions, such as a loudspeaker, display or instructions for a robot to move to a position or to an indicator directing a radiation beam to a desired position if desired.

In one situation, one or more of the navigation elements further has an appearance, the processor further being configured to determine an appearance of each visible navigation element, and to have the comparison further comprise:
determine that a visible navigation element has been rotated, relative to the predetermined information and either:
output instructions to rotate the navigation element to the original orientation or
update the predetermined information accordingly.

A fifth aspect of the invention relates to a method of analysing a scene, room or venue comprising a plurality of navigation elements, the method comprising:
for each of a plurality of positions in the scene/room/venue:
providing image data using an imaging element, and
determining, from the image data, an angle from the imaging element to one or more first navigation elements visible by the imaging element,
if, for one of the plurality of positions, the angles to all first navigation elements visible from the pertaining position vary less than a predetermined angle between viewing the navigation elements from a first position and a second position being a minimum distance from the first position:
then providing an additional navigation element in the room, venue or scene at a position from which the angle from the imaging element to the additional navigation element differs more than the predetermined angle between the first and second positions.

In this context, the scene or the like may be as described above, as may the imaging element, the processor and the navigation elements.

The precision with which a position may be determined relates to how much the angle(s) varies/vary when the imaging element moves a predetermined distance. The variation of an angle may depend on the imaging element and in particular the resolution thereof. The imaging element may not be able to determine a position with a higher precision than that afforded by the imaging element. As long as the image does not vary, the position seems to be the same. Thus, if the imaging element may move the predetermined distance, such as 5 cm, 10 cm, 20 cm, 30 cm, 50 cm, 100 cm, without the navigation element(s) seeming differently positioned, this movement is within the resolution offered by the navigation elements. When a navigation element or a part thereof is seen, after the movement, by another portion of the imaging element, the movement may be determined. Thus, the lowest angle difference which may be determined may be determined by the resolution of the imaging element. Another situation is a possible angle measurement error caused by different error types, such as lighting variation, thermal noise and the like. This also may decrease the precision with which an angle can be determined.

The predetermined angle may thus be the lowest angle difference which may be determined by the imaging element. This angle may be 1 degrees, 0.5 degrees, 0.1 degrees or less.

Clearly, the variation in an angle caused by moving will depend on the direction of movement vis-à-vis the direction toward the navigation element as well as the distance toward the navigation element.

If the navigation elements are, relative to the position, not positioned sufficiently suitable, another navigation element may be provided which is, i.e. which is positioned so that a sufficiently large angle variation is seen toward it when moving in relation to it.

A sixth aspect of the invention relates, similarly, to a system for analysing a scene, room or venue comprising a plurality of navigation elements, the system comprising:
an imaging element configured to provide image data at each of a plurality of positions in the scene/room/venue,
a processor configured to, for each position:
determine, from the image data, an angle from the imaging element to one or more first navigation elements visible by the imaging element,
if, for one of the plurality of positions, the angles to all first navigation elements visible from the pertaining position vary less than a predetermined angle between when viewing or imaging the navigation elements from a first position and a second position being a minimum distance from the first position:
then providing an additional navigation element in the room, venue or scene at a position from which the angle from the imaging element to the additional navigation element differs more than the predetermined angle between the first and second positions.

A seventh aspect of the invention relates to a method of analysing a scene, room or venue comprising a plurality of navigation elements, the method comprising:

for each of a plurality of positions in the scene/room/venue:

providing image data using an imaging element, and determining, from the image data, an angle from the imaging element to one or more first navigation elements visible by the imaging element, if:

the angles for all first navigation elements are below a first threshold angle relative to horizontal and the lowest relative angles, when projected on to a horizontal plane, between the angles of all pairs of the first navigation elements either are below a second threshold angle lower than 90 degrees or above 180 degrees subtracted the second threshold angle, then providing an additional navigation element in the room, venue or scene at a position from which the angle from the imaging element to the additional navigation element:

is above the first threshold angle relative to horizontal and/or has a relative angle relative to an angle of a first navigation element which, when projected on to the horizontal plane, is between the second threshold angle and 180 degrees subtracted the second threshold angle.

In this context, the scene or the like may be as described above, as may the imaging element, the processor and the navigation elements.

In this situation, the accuracy of the position determination is determined from how well the navigation elements are positioned. If the elements are positioned more or less on a straight line on which the imaging element is also positioned, the positioning accuracy may be acceptable in one plane or direction but not in a plane perpendicular thereto.

Thus, in that situation, an additional navigation element is added which has a more suitable position.

In this context, the first threshold angle relates to the angle to horizontal and thus relates to how much that angle will change when the imaging element moves a certain distance in the horizontal direction. Due to the sharp angle, this relative angle shift will not be very large, whereby the positioning accuracy will be correspondingly low.

The first threshold angle may be 30 degrees, such as 25, 20, 15, 10, 5 or 3 degrees.

The second threshold angle relates to how far a navigation element is from a straight line from another navigation element to through the imaging element. If the navigation element is sufficiently far from that line, a better position accuracy is determined.

The second threshold angle may be equal to or less than 30 degrees, such as 25, 20, 15, 10, 5 or 3 degrees The determination of the new position may be made also taking into account the considerations made in relation to the other aspects of the invention, such as if the position is unique with the newly added navigation element.

Also, the manner of indicating where the new navigation element should be positioned may be as described above.

An eighth aspect of the invention relates to a system for analysing a scene, room or venue comprising a plurality of navigation elements, the system comprising:

an imaging element configured to provide image data at each of a plurality of positions in the scene/room/venue, a processor configured to, for each position:

determine, from the image data, an angle from the imaging element to one or more first navigation elements visible by the imaging element, if:

the angles for all first navigation elements are below a first threshold angle relative to horizontal and the lowest relative angles, when projected on to a horizontal plane, between the angles of all pairs of the first navigation elements either are below a second threshold angle lower than 90 degrees or above 180 degrees subtracted the second threshold angle, then outputting instructions to provide an additional navigation element in the room, venue or scene at a position from which the angle from the imaging element to the additional navigation element:

is above the first threshold angle relative to horizontal and/or has a relative angle relative to an angle of a first navigation element which, when projected on to the horizontal plane, is between the second threshold angle and 180 degrees subtracted the second threshold angle.

In this context, the imaging element, processor, navigation elements, room and the like may be as described above.

The processor is capable of performing the function described in relation to the fifth aspect. The instruction outputting may be as described further above.

A ninth aspect of the invention relates to a method of analysing a scene, room or venue comprising a plurality of navigation elements, the method comprising:

for each of a plurality of positions in the scene/room/venue:

providing image data using an imaging element, and determining, from the image data, an angle from the imaging element to one or more first navigation elements visible by the imaging element, if, for one of the plurality of positions, the angles to all first navigation elements visible from the pertaining position vary less than a predetermined angle when from a first position to a second position being a minimum distance from the first position:

then repositioning a first navigation element in the room, venue or scene to a position from which the angle from the imaging element to the additional navigation element differs more than the predetermined angle between the first and second positions.

In this situation, compared to the fifth aspect, a navigation element is repositioned instead of providing an additional navigation element.

A tenth aspect of the invention relates similarly to a system for analysing a scene, room or venue comprising a plurality of navigation elements, the system comprising:

an imaging element configured to provide image data at each of a plurality of positions in the scene/room/venue, a processor configured to, for each position:

determine, from the image data, an angle from the imaging element to one or more first navigation elements visible by the imaging element, if, for one of the plurality of positions, the angles to all first navigation elements visible from the pertaining position vary less than a predetermined angle when from a first position to a second position being a minimum distance from the first position:

then repositioning a first navigation element in the room, venue or scene to a position from which the angle from the imaging element to the additional navigation element differs more than the predetermined angle between the first and second positions.

An eleventh aspect of the invention relates to a method of analysing a scene, room or venue comprising a plurality of navigation elements, the method comprising:

for each of a plurality of positions in the scene/room/venue:
providing image data using an imaging element, and
determining, from the image data, an angle from the imaging element to one or more first navigation elements visible by the imaging element,
if:
the angles for all first navigation elements are below a first threshold angle relative to horizontal and
the lowest relative angles, when projected on to a horizontal plane, between the angles of all pairs of the first navigation elements either are below a second threshold angle lower than 90 degrees or above 180 degrees subtracted the second threshold angle,
then repositioning a first navigation element in the room, venue or scene to a position from which the angle from the imaging element to the repositioned navigation element:
is above the first threshold angle relative to horizontal or
has a relative angle relative to an angle of another first navigation element which, when projected on to the horizontal plane, is between the second threshold angle and 180 degrees subtracted the second threshold angle.

This aspect corresponds to the seventh aspect with the difference that no new navigation element is added but an existing navigation element is displaced or repositioned. Clearly, all the considerations, embodiments and the like of any of the other aspects and embodiments are equally valid in this respect.

For example, the manner of indicating the navigation element to be displaced and the new position thereof may be as mentioned above.

Also, it may be ascertained that the position may be or remain unique due to this displacement, and it may be checked whether other positions in which the navigation element is visible before or after displacement are still unique.

A twelfth aspect of the invention relates to a system for analysing a scene, room or venue comprising a plurality of navigation elements, the system comprising:
an imaging element configured to provide image data at each of a plurality of positions in the scene/room/venue,
a processor configured to, for each position:
determining, from the image data, an angle from the imaging element to one or more first navigation elements visible by the imaging element,
if:
the angles for all first navigation elements are below a first threshold angle relative to horizontal and
the lowest relative angles, when projected on to a horizontal plane, between the angles of all pairs of the first navigation elements either are below a second threshold angle lower than 90 degrees or above 180 degrees subtracted the second threshold angle,
then output instructions for repositioning a first navigation element in the room, venue or scene to a position from which the angle from the imaging element to the repositioned navigation element:
is above the first threshold angle relative to horizontal or
has a relative angle relative to an angle of another first navigation element which, when projected on to the horizontal plane, is between the second threshold angle and 180 degrees subtracted the second threshold angle.

In this context, the imaging element, processor, navigation elements, room and the like may be as described above.

The processor is capable of performing the function described in relation to the seventh aspect. The instruction outputting may be as described further above.

BRIEF DESCRIPTION OF THE DRAWINGS

In the following, preferred embodiments of the invention will be described with reference to the drawing, wherein.

DETAILED DESCRIPTION

Figure 1:
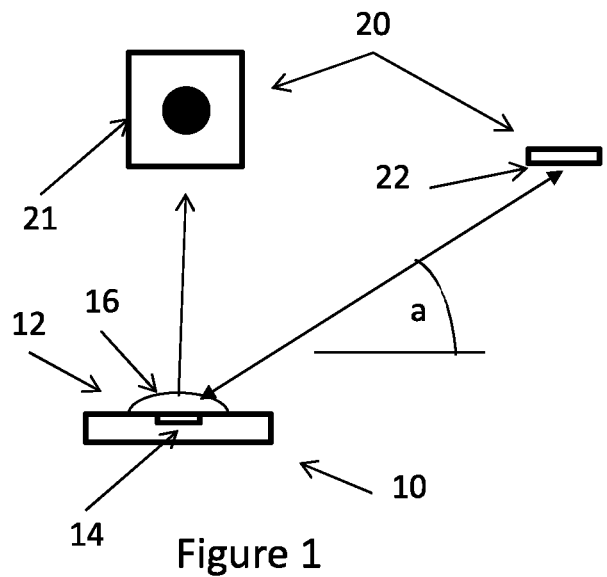
FIG. 1 illustrates angles between a detector and navigation elements.

In FIG. 1, a detector 10 is illustrated which has a camera 12 comprising a sensing element 14 and a lens 16. The detector may be provided on a robot or the like and may be used for navigating the robot, which may then be rather simple in that the navigation takes place in the detector. Alternatively, the detector may be a camera on a mobile phone, pad, portable or the like.

The camera 12 may be pointed upwardly and/or to the sides to see navigation elements 20 which are positioned in different positions in a room, venue, space or the like within which it is desired to navigate the robot. Thus, it is desired that the detector from the visible navigation elements is able to determine its position in the room or the like.

This set-up is a rather simple set-up. The initial installation may comprise the steps of installing a number of the navigation elements in the ceiling and/or on the walls of the room and/or on other elements of the room. Then driving or moving the detector or robot around the room while allowing the detector to image and detect the navigation elements and thus form a map of the room and its position relative to the navigation elements.

Subsequently, the robot preferably is able to navigate the room by itself and/or the detector is able to determine its position in the room only by detecting the navigation elements.

Figure 4:
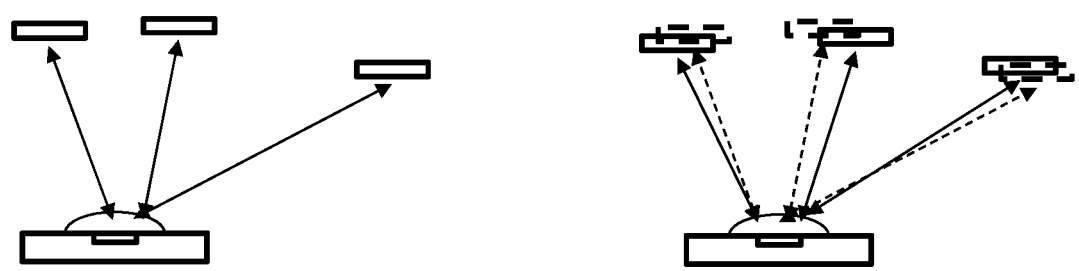

However, situations may exist in which this is not entirely possible. In one situation, two positions in the room may "look the same" from the detector. If the navigation elements are positioned, seen from the detector, in the same positions or at the same relative angles, the detector cannot decide in which position it is. This is illustrated in FIG. 4 in which, to the left, a root is in a first position and identifies the position from the angles toward the visible navigation elements. To the right, the robot is illustrated in another position which is determined from angles toward the visible navigation elements (unbroken lines). The angles toward the navigation elements in the first position are illustrated as broken lines. Thus, it is seen that the respective angles are very close so that the first and second positions may easily be confused.

In another situation, a navigation element may be displaced, removed or added compared to the map from which the detector works. In that situation, the detector may know in which position it is, but the map does not fit what the detector sees. In this situation, the detector may output information as to this discrepancy with the map. Then, the map may be adapted to the missing/replaced/new navigation element, or the navigation elements may be restored to the situation of the map, whereby a navigation element is added in the correct position, moved to the correct position—or an added navigation element may be removed again.

In yet another situation, the navigation elements may be positioned so that the detector is not able to determine its position, relative to the navigation elements, with a sufficient accuracy. In this situation, one or more navigation elements may be repositioned, or one or more navigation elements may be added to increase this accuracy.

All the situations will be described in more detail below.

In general, the detector determines its position from the navigation element(s) which is/are visible at this particular time. The detector is a vision detector which provides an image of what the detecting element 14 sees. The lens 16 naturally determines the field of view. The field of view preferably is 180*180 degrees so that a hemisphere is viewed by the detector. A smaller field of view would also work.

From the image or image data, the detector will determine which navigation element(s) is/are visible and the directions toward each individual navigation element. In FIG. 1, one navigation element is more or less directly above the detector, so that the angle is about 90 degrees to horizontal, and another navigation element is far away and thus visible through an angle, a, which is closer to horizontal. Additional navigation elements may be represented in the image data but are so far away or have an angle so small that they or their positions cannot be determined from the image data. These navigation elements then are not visible in this sense.

A position may be unique in the sense that there are no other positions in the room or map from which the detector will see the same or identical navigation elements at the same angles. In this context, the angle is determined from the image data and thus may be inaccurate to a certain degree.

Figure 3:
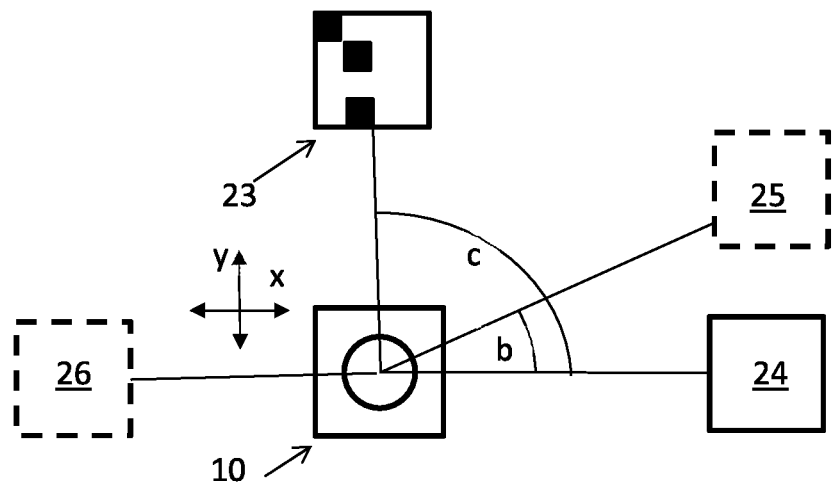
FIG. 3 illustrates adding/removing/displacing navigation elements and
FIG. 4 illustrates similar positions.

A position may be unique even if a single navigation element is visible, such as if the detector is directly below it or if this navigation element has an appearance which is not rotationally symmetric. In FIG. 1, the appearance of the navigation element is rotationally symmetric, whereas that illustrated in FIG. 3 is not.

Clearly, all navigation elements may be unique in themselves so as to have unique appearances. When the detector is able to see a unique navigation element, it may be able to determine its position from that information alone.

However, using only unique navigation elements makes the setting-up and especially the expansion of the navigation in rooms and the like difficult in that it then may be required to determine the appearances of all navigation elements in the room in order to determine which navigation elements may be added to that room. It is desired, however, that not all navigation elements of the room are identical. However, even in that situation, the invention will work as what is then adapted may be the relative positions of the navigation elements.

The relative positions between the navigation elements may make a position unique, independently of the appearances of the navigation elements, if the navigation elements are not positioned in a regular pattern. Alternatively, a less stringent requirement of the positions of the navigation elements may be achieved when the navigation elements do not all have the same appearance—and/or when the navigation elements have an appearance which is not rotationally symmetric and they have different rotational positions relative to each other.

Now, the detector may be positioned at different positions, such as when driven around on a robot or when the detector is a mobile phone or camera carried around in the room. For each position, the detector may determine which navigation elements are visible and the relative directions to these.

If a position is not unique, i.e. if another position exists in which the same relative angles are seen to the same (at least in relation to the same appearances) navigation elements, the detector is not able to uniquely determine its position in the room.

In this manner, the detector may act in one of multiple manners. The detector may output information to this effect and give advice as to what to do about this.

The detector already knows of a number of other positions and the relative angles and navigation elements therein. Thus, the detector may propose the addition of another navigation element and even a position for it. Clearly, such an element and the position will be selected in a manner so that the position becomes unique—i.e. that no other position has the resulting relative angles and navigation elements.

Alternatively, the detector may propose the displacement of a navigation element. In that situation, additional navigation elements are not required. Again, the detector may ensure that this position then becomes unique.

In addition, the detector may simply propose the removal of a navigation element if this renders this position unique.

Clearly, when adding/removing/displacing a navigation element, this may have an impact on other positions from which that navigation element is visible. Thus, the suggestion to add/remove/displace a navigation element may be made on the basis of also the impact thereon on the other positions. If the other positions were unique, it may be desired that after the amendment, they are still unique.

In this context, it is noted that the camera 12 has a predetermined resolution. Thus, the camera 12 will be able to identify a navigation element when the navigation element takes up enough area on the detecting element 14 and in the image. If the navigation element is too far away, it may take up so little area that the direction toward it is difficult to determine with sufficient accuracy. Also, if the navigation element is viewed too much from the side (see FIG. 1 for navigation element 22), it will be represented in the image as a more narrow stripe. Thus, even though it may be possible to determine the angle toward the navigation element, it may be impossible to identify the appearance thereof. In that situation, it will not assist in the position determination if the appearance of that navigation element was unique and not rotationally symmetric.

Thus, if the angle of the relative direction from the camera to the navigation element is below a first threshold angle compared to horizontal, it may be decided that it is not possible to determine the appearance of a navigation element. Also, it may be decided that if the angle is below a second threshold angle compared to horizontal, where the second threshold angle is lower than the first threshold angle, it may be decided that the angle cannot be determined with a desired accuracy, so that this navigation element is considered not visible.

Figure 2:
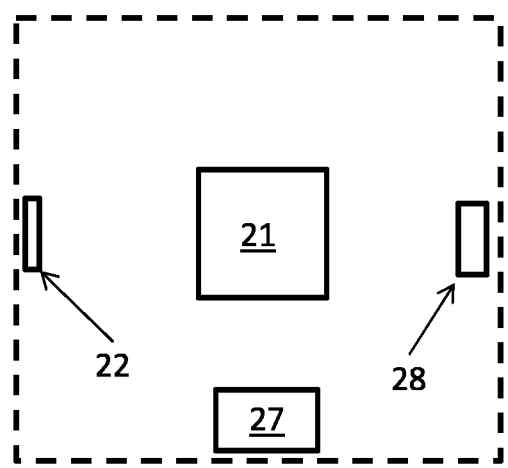
FIG. 2 illustrates an image depicting navigation elements.

In FIG. 2, an image is seen in which the detector sees the navigation element 21 which is more or less directly above the camera, and the navigation element 22 which may be far away and thus merely visible as a narrow line. The overall definition of visible or not and whether the appearance may be determined or not may relate to the resolution and the number of pixels of the image representing each navigation element.

Thus, the navigation element 22 may be positioned far from the camera or may be directed more or less away from the camera, so that it is seen more or less directly from the side.

Also seen are navigation element 27, the representation of which is more square-shaped, so that its appearance may be determined, and navigation element 28 which is less square-shaped and only the position of which may be determined.

Clearly, this manner of categorizing the navigation elements is independent on whether the navigation elements are positioned on walls, the ceiling or other elements in the room.

In FIG. 3, another situation relating to the navigation or position determination based on the navigation elements is illustrated. The accuracy with which the position may be determined relates to how the visible navigation elements are positioned vis-à-vis the detector 10. A coordinate system is illustrated as an x/y system.

If the only visible navigation elements are 24 and 26, which lie on more or less a straight line on which the detector 10 also lies, the accuracy in the x direction relates to how well a distance to the navigation elements may be determined, and the accuracy in the y direction depends on how well the angle to the elements may be determined. It may be desired to not attempt to determine the distance to navigation elements as this may be determined from e.g. the extent thereof in the image data, which is error prone especially when the navigation elements are far away and therefore represented by small areas or distances in the image.

Naturally, if the navigation element 25 is also visible, the position may be better determined as it does not lie on the line on which the elements 24/26 lie. Then, the position may be determined using triangulation using the angles alone.

It is especially interesting when the element 23 is visible, as the angle to this element is more or less perpendicular to that toward the element 24.

Now, if a position is not unique, or if the position cannot be determined with a sufficient accuracy, the detector may propose the addition of a navigation element, and even a suitable position thereof, the appearance thereof and/or a rotation thereof. In relation to FIG. 3, the position is determined with a low accuracy if the only visible elements are 24/26, but the addition of the element 23 makes the accuracy much higher.

Thus, the detector may, in addition to making a position unique, determine a position which also increases the accuracy of the position determination. Naturally, a unique position may also be enhanced to increase the position determination accuracy.

Alternatively, the detector may determine that a navigation element should be replaced (if it is not desired to spend resources on another navigation element) by moving either the element 25 or the element 26 to the position of the element 23. Clearly, this is possible only if this is acceptable for all positions from which the proposed displaced element is visible.

The invention claimed is:

1. A method of analysing a scene, room or venue comprising a plurality of navigation elements, the method comprising:
at each of a plurality of positions in the scene/room/venue:
providing image data using an imaging element,
determining which navigation elements are visible from the pertaining position and
determining an angle from the imaging element to each of the visible navigation elements,
identifying one or more groups of positions wherein the angles relating to respective visible navigation elements vary by no more than 10 degrees from position to position, and
outputting information relating to the identified groups.

2. The method according to claim 1, wherein all navigation elements have an appearance, where the appearance of each visible navigation element is determined, and wherein the identifying step comprises identifying the one or more groups of positions wherein, in each position of a group of positions, the visible navigation element(s) have the same appearances.

3. The method according to claim 2, wherein at least one navigation element has a non-rotationally symmetric appearance and wherein the identifying step comprises identifying the one or more groups of positions wherein, in each position of a group of positions, the visible navigation element(s) have the same appearances and relative rotation.

4. The method according to claim 1, wherein one or more of the navigation elements are elements fastened to walls and/or ceilings of the scene/room/venue.

5. The method according to claim 1, further comprising adding a navigation element visible from an identified position.

6. The method according to claim 1, further comprising removing a navigation element visible from an identified position.

7. The method according to claim 1, further comprising displacing a navigation element visible from an identified position.

8. A system for analysing a scene, room or venue comprising a plurality of navigation elements, the system comprising:
an imaging element configured to provide image data at each of a plurality of positions in the scene/room/venue,
a processor configured to, for each position:
determine which navigation elements are visible from the pertaining position,
determine an angle from the imaging element to each of the visible navigation elements,
identify one or more groups of positions wherein the angles relating to respective visible navigation elements vary by no more than 10 degrees from position to position, and
output information relating to the identified groups.

9. The system according to claim 8, wherein all navigation elements have an appearance, where the controller is configured to determine an appearance of each visible navigation element, and to identify the one or more groups of positions wherein, in each position of a group of positions, the visible navigation element(s) have the same appearances.

10. The system according to claim 9, wherein at least one navigation element has a non-rotationally symmetric appearance and wherein the processor is configured to identify the one or more groups of positions wherein, in each position of a group of positions, the visible navigation element(s) have the same appearances and relative rotation.

11. The system according to claim 8, wherein one or more of the navigation elements are elements fastened to walls and/or ceilings of the scene/room/venue.

12. The system according to 8, wherein the processor is configured to output information as to the adding of a navigation element visible from an identified position.

13. The system according to claim 8, wherein the processor is configured to output information as to the removing of a navigation element visible from an identified position.

14. The system according to claim 8, wherein the processor is configured to output information as to the displacing of a navigation element visible from an identified position.

15. A method of analysing a scene, room or venue comprising a plurality of navigation elements, the method comprising, at each of a plurality of positions in the scene/room/venue:
  providing image data using an imaging element,
  determining from the image data which navigation elements are visible from the pertaining position,
  determining an angle from the imaging element to each of the visible navigation elements,
  comparing the angle(s) to predetermined information and determining whether all visible navigation elements are positioned with angles according to the predetermined information and
  if the comparison identifies that a navigation element has been displaced relative to the predetermined information, either:
    repositioning the navigation element to the original position or
    updating the predetermined information accordingly or
    positioning the navigation element at a new position where, for each first position of the positions from which the navigation element at the new position is visible, angles exist to all navigation elements visible from the pertaining first position, and where no other position exists having angles toward all navigation elements visible from the other position, which angles are within 10 degrees of the angles toward the navigation elements visible from the pertaining first position, and/or
  if the comparison identifies that a navigation element is missing relative to the predetermined information, either:
    positioning a navigation element in the position of the missing navigation element or
    updating the predetermined information accordingly or
    positioning the navigation element at a new position where, for each first position of the positions from which the navigation element at the new position is visible, angles exist to all navigation elements visible from the pertaining first position, and where no other position exists having angles toward all navigation elements visible from the other position, which angles are within 10 degrees of the angles toward the navigation elements visible from the pertaining first position.

16. The method according to claim 15, wherein one or more of the navigation elements further has an appearance, the method further comprising determining an appearance of each visible navigation element, wherein the comparison further comprises:
  determining that a visible navigation element has been rotated, relative to the predetermined information and either:
    rotating the navigation element to the original orientation or
    updating the predetermined information accordingly.

17. A system for analysing a scene, room or venue comprising a plurality of navigation elements, the system comprising:
  an imaging element configured to provide image data at each of a plurality of positions in the scene/room/venue,
  a processor configured to, for each position:
    determine from the image data which navigation elements are visible from the pertaining position,
    determine an angle from the imaging element to each of the visible navigation elements,
    compare the angle(s) to predetermined information and determining whether all visible navigation elements are positioned with angles according to the predetermined information and
    if the comparison identifies that a navigation element has been displaced relative to the predetermined information, either:
      output instructions to reposition the navigation element to the original position or
      update the predetermined information accordingly or
      output instructions to position the navigation element at a new position where, for each first position of the positions from which the navigation element at the new position is visible, angles exist to all navigation elements visible from the pertaining first position, and where no other position exists having angles toward all navigation elements visible from the other position, which angles are within 10 degrees of the angles toward the navigation elements visible from the pertaining first position, and/or
    if the comparison identifies that a navigation element is missing relative to the predetermined information, either:
      output instructions to position a navigation element in the position of the missing navigation element or
      update the predetermined information accordingly or
      output instructions to position the navigation element at a new position where, for each first position of the positions from which the navigation element at the new position is visible, angles exist to all navigation elements visible from the pertaining first position, and where no other position exists having angles toward all navigation elements visible from the other position, which angles are within 10 degrees of the angles toward the navigation elements visible from the pertaining first position.

18. The system according to claim 17, wherein one or more of the navigation elements further has an appearance, the processor further being configured to determine an appearance of each visible navigation element, and to have the comparison further comprise:
  determine that a visible navigation element has been rotated, relative to the predetermined information and either:
    output instructions to rotate the navigation element to the original orientation or
    update the predetermined information accordingly.

19. A method of analysing a scene, room or venue comprising a plurality of navigation elements, the method comprising:
  for each of a plurality of positions in the scene/room/venue:
    providing image data using an imaging element, and
    determining, from the image data, an angle from the imaging element to one or more first navigation elements visible by the imaging element,
  if, for one of the plurality of positions, the angles to all first navigation elements visible from the pertaining position vary less than a predetermined angle when from a first position to a second position being a minimum distance from the first position:
    then providing an additional navigation element in the room, venue or scene at a position from which the angle from the imaging element to the additional navigation element differs more than the predetermined angle between the first and second positions.

20. A system for analysing a scene, room or venue comprising a plurality of navigation elements, the system comprising:
an imaging element configured to provide image data at each of a plurality of positions in the scene/room/venue,
a processor configured to, for each position:
determine, from the image data, an angle from the imaging element to one or more first navigation elements visible by the imaging element,
if, for one of the plurality of positions, the angles to all first navigation elements visible from the pertaining position vary less than a predetermined angle when from a first position to a second position being a minimum distance from the first position:
then providing an additional navigation element in the room, venue or scene at a position from which the angle from the imaging element to the additional navigation element differs more than the predetermined angle between the first and second positions.

21. A method of analysing a scene, room or venue comprising a plurality of navigation elements, the method comprising:
for each of a plurality of positions in the scene/room/venue:
providing image data using an imaging element, and
determining, from the image data, an angle from the imaging element to one or more first navigation elements visible by the imaging element,
if:
a) the angles for all first navigation elements are below a first threshold angle relative to horizontal and
b) the lowest relative angles, when projected on to a horizontal plane, between the angles of all pairs of the first navigation elements either are below a second threshold angle lower than 90 degrees or above 180 degrees subtracted the second threshold angle,
then providing an additional navigation element in the room, venue or scene at a position from which the angle from the imaging element to the additional navigation element:
c) is above the first threshold angle relative to horizontal and/or
b) has a relative angle relative to an angle of a first navigation element which, when projected on to the horizontal plane, is between the second threshold angle and 180 degrees subtracted the second threshold angle.

22. A system for analysing a scene, room or venue comprising a plurality of navigation elements, the system comprising:
an imaging element configured to provide image data at each of a plurality of positions in the scene/room/venue,
a processor configured to, for each position:
determine, from the image data, an angle from the imaging element to one or more first navigation elements visible by the imaging element,
if:
a) the angles for all first navigation elements are below a first threshold angle relative to horizontal and
b) the lowest relative angles, when projected on to a horizontal plane, between the angles of all pairs of the first navigation elements either are below a second threshold angle lower than 90 degrees or above 180 degrees subtracted the second threshold angle,
then providing an additional navigation element in the room, venue or scene at a position from which the angle from the imaging element to the additional navigation element:
c) is above the first threshold angle relative to horizontal and/or
d) has a relative angle relative to an angle of a first navigation element which, when projected on to the horizontal plane, is between the second threshold angle and 180 degrees minus the second threshold angle.

23. A method of analysing a scene, room or venue comprising a plurality of navigation elements, the method comprising:
for each of a plurality of positions in the scene/room/venue:
providing image data using an imaging element, and
determining, from the image data, an angle from the imaging element to one or more first navigation elements visible by the imaging element,
if, for one of the plurality of positions, the angles to all first navigation elements visible from the pertaining position vary less than a predetermined angle between viewing the navigation elements from a first position and a second position being a minimum distance from the first position:
then repositioning a first navigation element in the room, venue or scene to a position from which the angle from the imaging element to the additional navigation element differs more than the predetermined angle between the first and second positions.

24. A system for analysing a scene, room or venue comprising a plurality of navigation elements, the system comprising:
an imaging element configured to provide image data at each of a plurality of positions in the scene/room/venue,
a processor configured to, for each position:
determine, from the image data, an angle from the imaging element to one or more first navigation elements visible by the imaging element,
if, for one of the plurality of positions, the angles to all first navigation elements visible from the pertaining position vary less than a predetermined angle between viewing or imaging the navigation elements from a first position and a second position being a minimum distance from the first position:
then repositioning a first navigation element in the room, venue or scene to a position from which the angle from the imaging element to the additional navigation element differs more than the predetermined angle between the first and second positions.

25. A method of analysing a scene, room or venue comprising a plurality of navigation elements, the method comprising:
for each of a plurality of positions in the scene/room/venue:
providing image data using an imaging element, and
determining, from the image data, an angle from the imaging element to one or more first navigation elements visible by the imaging element,
if:

a) the angles for all first navigation elements are below a first threshold angle relative to horizontal and b) the lowest relative angles, when projected on to a horizontal plane, between the angles of all pairs of the first navigation elements either are below a second threshold angle lower than 90 degrees or above 180 degrees subtracted the second threshold angle, then repositioning a first navigation element in the room, venue or scene to a position from which the angle from the imaging element to the repositioned navigation element:

c) is above the first threshold angle relative to horizontal or b) has a relative angle relative to an angle of another first navigation element which, when projected on to the horizontal plane, is between the second threshold angle and 180 degrees subtracted the second threshold angle.

26. A system for analysing a scene, room or venue comprising a plurality of navigation elements, the system comprising:

an imaging element configured to provide image data at each of a plurality of positions in the scene/room/venue, a processor configured to, for each position:

determining, from the image data, an angle from the imaging element to one or more first navigation elements visible by the imaging element, if:

a) the angles for all first navigation elements are below a first threshold angle relative to horizontal and b) the lowest relative angles, when projected on to a horizontal plane, between the angles of all pairs of the first navigation elements either are below a second threshold angle lower than 90 degrees or above 180 degrees subtracted the second threshold angle, then repositioning a first navigation element in the room, venue or scene to a position from which the angle from the imaging element to the repositioned navigation element:

c) is above the first threshold angle relative to horizontal or d) has a relative angle relative to an angle of another first navigation element which, when projected on to the horizontal plane, is between the second threshold angle and 180 degrees subtracted the second threshold angle.

* * * * *